(12) United States Patent
Frings et al.

(10) Patent No.: US 6,404,112 B1
(45) Date of Patent: Jun. 11, 2002

(54) ELECTRIC LAMP/REFLECTOR UNIT

(75) Inventors: Hubert Frings, Alsdorf; Herbert Heinrich Kreus, Stolberg; Franz Herbert Kaulen, Aachen, all of (DE)

(73) Assignee: Koninklijke Philips Electronics N.V. (NL)

( * ) Notice: Subject to any disclaimer, the term of this patent is extended or adjusted under 35 U.S.C. 154(b) by 129 days.

(21) Appl. No.: 09/583,030

(22) Filed: May 30, 2000

(30) Foreign Application Priority Data

Jun. 3, 1999 (EP) .............................. 99201761

(51) Int. Cl.[7] .......................... H01J 61/30; H01K 1/24; F21V 19/00

(52) U.S. Cl. ...................... 313/113; 313/573; 313/578; 313/634; 362/310; 362/341

(58) Field of Search ................................ 313/113, 569, 313/570, 572, 573, 574, 578, 634; 362/296, 310, 341

(56) References Cited

U.S. PATENT DOCUMENTS

| | | | | |
|---|---|---|---|---|
| 5,019,743 A | * | 5/1991 | Owler et al. ................ | 313/113 |
| 5,144,190 A | * | 9/1992 | Thomas et al. ............. | 313/113 |
| 5,466,981 A | * | 11/1995 | Fields et al. ................ | 313/113 |

FOREIGN PATENT DOCUMENTS

EP 0397422 11/1990 ............ H01K/1/24

\* cited by examiner

*Primary Examiner*—Ashok Patel
(74) *Attorney, Agent, or Firm*—Dicran Halajian

(57) ABSTRACT

The electric lamp/reflector unit includes a reflector body (1) having a reflector portion (2) with a concave reflecting surface (3), and a neck-shaped portion (5), both surrounding an optical axis (4). The unit includes an electric lamp (10) which is provided with a lamp vessel (11) having a cavity (13) wherein an electric light source (14) is arranged. The cavity (13) is provided with an infrared-reflecting and visible light-transmitting coating (15). The electric lamp (10) has a first (23) and a second (24) end portion which are arranged opposite each other and provided with a seal, through which seals respective current conductors (23; 24) connected via embedded metal foils (17; 18) to the electric light source (14) issue from the lamp vessel (11) to the exterior. According to the invention, the electric lamp (10) is fitted in the reflector body (1) with the first end portion (21) inside the neck-shaped portion (5), while the cavity (13) lies within the reflecting portion (2) and the electric light source (16) is on the optical axis (4). The ratio of the distance $d_c^I;d_c^{II}$, from the connection point (27; 28) where the current conductor (23; 24) is connected to the metal foil (17; 18), to the length $l_{ep}^I;l_{ep}^{II}$ of the first and the second end portion (21; 22) lies in the range $d_c^I/l_{ep}^I \geq 0.75$ and $d_c^{II}/l_{ep}^{II} \geq 0.75$, the distance $d_c^I;d_c^{II}$ and the length $l_{ep}^I;l_{ep}^{II}$ being measured with respect to a geometrical center (14) of the lamp vessel (11).

15 Claims, 3 Drawing Sheets

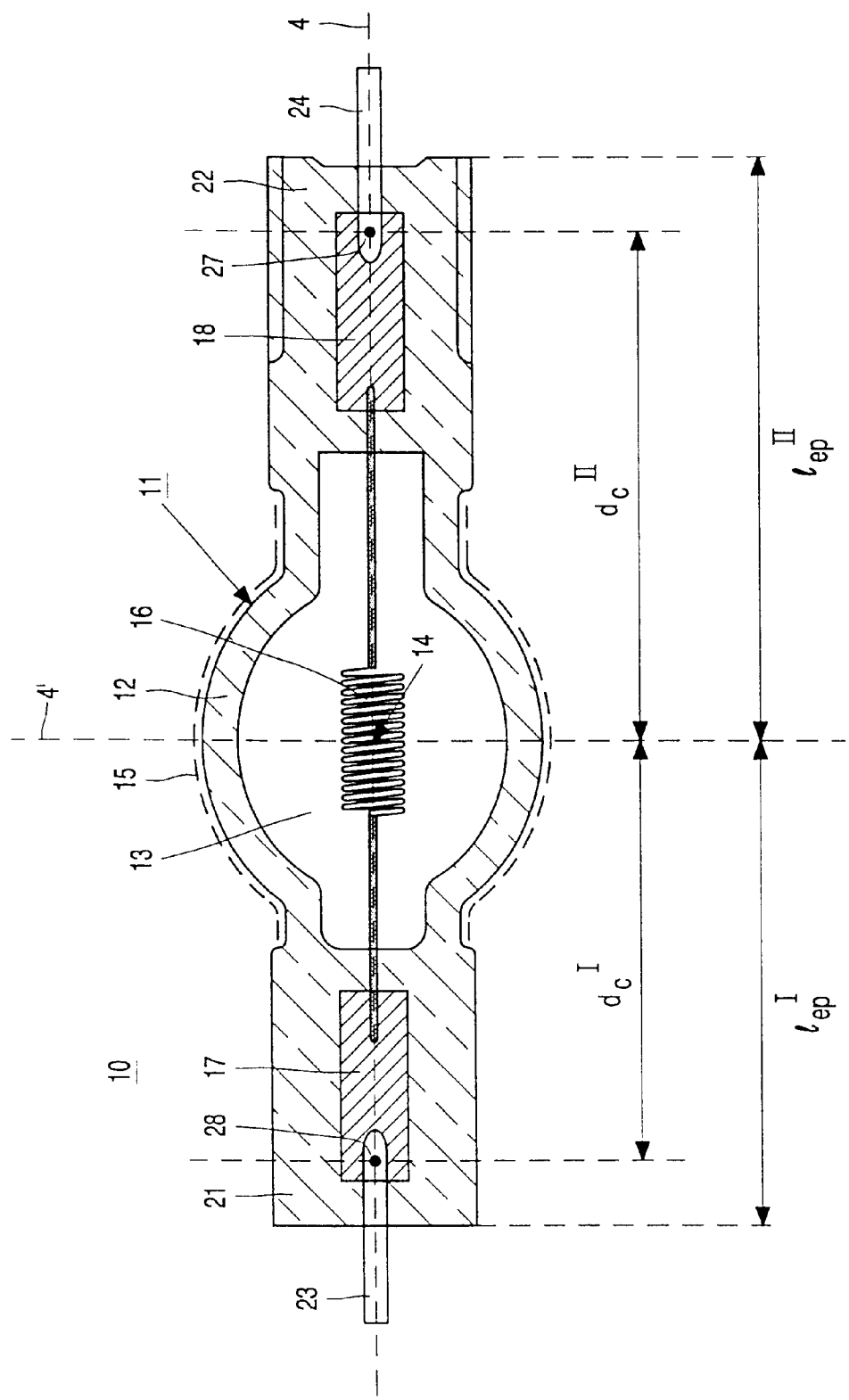

ELECTRIC LAMP/REFLECTOR UNIT

FIELD OF THE INVENTION

The invention relates to an electric lamp/reflector unit comprising
a reflector body including a reflector portion having a concave reflecting surface with an optical axis and, integral therewith, a hollow neck-shaped portion about the optical axis,
and an electric lamp provided with a gastight light-transmitting lamp vessel
and comprising a quartz-glass wall which encloses a cavity of a predetermined, in general, spherical or elliptic shape with a geometric center, said wall being at least partly provided with an infrared-reflecting and visible light-transmitting coating, and said cavity accommodating a, substantially, linear electric light source,
and said lamp also comprising a metal foil which is entirely embedded in the wall and connected to the electric light source,
and comprising a first end portion and a second end portion which are arranged so as to be opposite to each other and which both comprise a seal, through which seals a respective current conductor, which is connected to the embedded metal foil, issues from the lamp vessel to the exterior.

The invention further relates to an electric lamp for use in an electric lamp/reflector unit.

Such electric lamp/reflector units are used as a source of white light for general and decorative lighting applications.

BACKGROUND OF THE INVENTION

An electric lamp/reflector unit of the type mentioned in the opening paragraph is known from EP-A 0 397 422. In said document a description is given of a so-called double-ended halogen lamp provided with an infrared-reflecting interference filter, which lamp is arranged in a reflector body of the PAR 38 type, where the abbreviation PAR stands for Parabolic Aluminium Reflector, and the number "38" indicates a diameter of the reflector body at the location of the light emission window, the diameter being obtained by multiplying said number with an eighth of an inch, 1 inch being 25.4 mm, so that the diameter of the emission window of a PAR 38 reflector is 38×⅛ inch≈121 mm. It is an object of the inventors to enable such a double-ended halogen lamp to be fitted also in known PAR reflector bodies of a smaller physical size, for example in a PAR 20 reflector body having a diameter of the emission window of 20×⅛ inch≈63.5 mm, and, particularly, in a PAR 16 reflector body having a diameter of the emission window of 16×⅛ inch≈51 mm. An alternative embodiment of the reflector body is referred to as MR 16 ("metal reflector"), which, in comparison with a PAR reflector body having a corresponding diameter indication, has a neck-shaped portion which, viewed along the optical axis, is much shorter.

In order to bring about a satisfactory ratio between the reflector body and the double-ended electric (halogen) lamp, it is desirable to reduce the dimensions of the known electric lamp; however, this causes the temperature balance of such a miniaturized electric lamp to be adversely affected. In general, such an adversely affected temperature balance has a negative effect on the service life of the electric lamp in the electric lamp/reflector unit.

SUMMARY OF THE INVENTION

It is an object of the invention to adapt the dimensions of the electric lamp so as to make the electric lamp suitable for use in reflector bodies whose dimensions are smaller than the dimensions of the known electric lamp/reflector unit, and said adaptations also obviating the above drawbacks.

To achieve this, the electric lamp/reflector unit is characterized in accordance with the invention in that
the electric lamp is arranged in the reflector body in such a manner that the first end portion is at least partly situated in the neck-shaped portion, the cavity is situated within the reflecting portion and the electric light source is predominantly situated on the optical axis,
and in that the ratio of the distance $d_c^I;d_c^{II}$ from the connection point where the current conductor is connected to the metal foil to the length $l_{ep}^I;l_{ep}^{II}$ of the first and the second end portion lies in the range $d_c^I/l_{ep}^{II} \geq 0.75$ and $d_c^I;l_{ep}^{II} \geq 0.75$, the distance $d_c^I;d_c^{II}$ and the length $l_{ep}^I;l_{ep}^{II}$ being measured with respect to the geometric center of the lamp vessel.

By arranging one of the end portions of the electric lamp at least partly in the neck portion of the reflector body, it is achieved, viewed along the optical axis, to reduce the relative height of the electric lamp with respect to the reflector body, which has a favorable influence on the ratio of the dimensions of the double-ended electric lamp with respect to the dimension of the reflector body of the known electric lamp/reflector unit. In the known electric lamp/reflector unit, a double-ended halogen lamp is bodily arranged in the reflector portion of the reflector body by means of so-called mounting legs. By securing, in accordance with the invention, the first end portion of the electric lamp in the neck portion of the reflector body, a sturdy and reliable connection of the electric lamp with the reflector body is achieved. In addition, the positioning of the electric light source on the optical axis of the reflector portion is improved thereby, the electric light source preferably being positioned such that the geometric center of the electric lamp is situated in the focus of the concave reflecting surface. The improved positionability results in a higher light output and a better light distribution of the electric lamp/reflector unit.

The inventors have recognized that the miniaturization of the electric lamp, which makes it possible and attractive to fit said lamp in a reflector body having much smaller dimensions than the dimensions of the known electric lamp/reflector unit, causes, in particular, the so-called pinch temperature of the electric lamp to increase, which adversely affects, in particular, the service life of the electric lamp. The temperature of the pinch of a lamp is measured at the location of the connection point (generally formed by a welded joint) of the (external) current conductor and the metal foil embedded in the wall of the electric lamp. In general, a high pinch temperature enhances corrosion of the metal foil and/or the external current conductor. Corrosion leads to failure of the lamp as a result of the current supply being interrupted. Other causes of failure include, for example, leakage of the lamp vessel or explosion of the lamp. If in the electric lamp in accordance with the invention, the connection point between the metal foil and the external current conductor is positioned as faraway from the heat source (the electric lamp) as possible, a reduction of the pinch temperature is obtained.

Experiments have shown that a lower limit of $d_c^I/l_{ep}^I = 0.75$ and $d_c^{II};l_{ep}^{II} = 0.75$ is desirable, in spite of the fact that the pinch temperature of the electric lamp in the electric lamp/reflector unit in accordance with the invention is higher than the pinch temperature of the known electric lamp/reflector unit, in order to achieve that the service life of the electric lamp in the electric lamp/reflector unit in accordance with the invention is at least comparable to the service life of the known electric lamp/reflector unit.

Preferably, the ratio of the distance $d_c^I;d_c^{II}$ to the length $l_{ep}^I;l_{ep}^{II}$ lies in the range $0.8 \leq d_c^I/l_{ep}^I \leq 0.95$ and $0.8 \leq d_c^{II}/l_{ep}^{II} \leq 0.95$. A lower limit of $d_c^I/l_{ep}^I=0.8$ and $d_c^{II};l_{ep}^{II}=0.8$ causes the service life of the electric lamp in the electric lamp/reflector unit in accordance with the invention to be longer than the service life of the known electric lamp/reflector unit. An upper limit of $d_c^I/l_{ep}^I=0.95$ and $d_c^{II}/l_{ep}^{II}=0.95$ has the advantage that the part of the end portion situated between the connection point and the end of the end portion gives sufficient mechanical support to the (external) current conductor during the service life of the electric lamp. As a result, the risk that the current conductor breaks off during the service life of the electric lamp/reflector unit is reduced.

An embodiment of the electric lamp/reflector unit is characterized in accordance with the invention in that the length $l_{ep}^I;l_{ep}^{II}$ of the first and the second end portion lies in the range $12 \leq l_{ep}^I \leq 22$ mm and $12 \leq l_{ep}^{II} \leq 22$ mm. If the first end portion is secured in the neck-shaped portion, such a length of the end portions enables the electric lamp to be fitted in a so-called PAR 20 reflector body.

An extremely favorable embodiment of the electric lamp/reflector unit in accordance with the invention is characterized in that the length $l_{ep}^I;l_{ep}^{II}$ of the first and the second end portion is $l_{ep}^I \leq 18$ mm and $l_{ep}^{II} \leq 18$ mm. Such a length of the end portions enables the electric lamp to be fitted in a so-called PAR 16 reflector body and in a so-called MR 16 reflector body.

The safety of the electric lamp/reflector unit is enhanced if the emission window of the reflector body is closed by means of a lens. In this manner, it can be precluded that inflammable objects come into contact with hot parts of the lamp. In addition, such a lens can limit the risks as a result of an explosion of the lamp vessel. The lens may be fixed to the reflector body by means of an adhesive, for example silicone paste. Alternatively, the lens can be secured mechanically, using, for example, a metal ring which is rolled over the reflector body. A clamping ring or a number of clamps may alternatively be used. The lens may be flat or curved.

In a favorable modification, the reflecting portion has a substantially cylindrical end portion near the lens. By virtue thereof, the volume within the reflecting portion can be larger so as to obtain a lower overall temperature, if so desired, without the increase in volume leading to an increase in diameter of the unit. It is alternatively possible to provide the reflector body at the outside with a profiled, for example rippled, surface. As a result, the surface area is increased, enabling a greater heat emission.

An alternative embodiment of the electric lamp/reflector unit is characterized in accordance with the invention in that the length $l_{ep}^I$ of the first end portion in the neck-shaped portion of the reflector body is substantially smaller than the length $l_{ep}^{II}$ of the second end portion. An advantage of providing the first end portion of the electric lamp in the neck portion of the reflector body resides in that, via the connection to the neck-shaped portion, using, for example, a heat-conducting and/or ceramic glued joint, the relevant end portion has a good heat dissipation by means of heat conduction, which reduces the pinch temperature of the first end portion with respect to the second end portion. At a constant pinch temperature of the first and the second end portion, it is sufficient to use a first end portion which is shorter than the second end portion.

Preferably, the ratio of the length $l_{ep}^I$ of the first end portion to the length $l_{ep}^{II}$ of the second end portion lies in the range $0.7 \leq l_{ep}^I/l_{ep}^{II} \leq 0.9$. Dependent upon the connection used between the first end portion and the neck-shaped portion of the reflector body, a reduction in length of the first end portion by 10–30% results in a comparable pinch temperature for the first and the second end portion.

The electric lamp may be an incandescent body, for example in a halogen-containing inert gas, or an electrode-pair in an ionizable gas. An alternative embodiment of the electric lamp/reflector unit is characterized in accordance with the invention in that the electric light source comprises an incandescent body having a length $l_{ib}$, and the ratio of the length of the incandescent body $l_{ib}$ to the length $l_{ca}$ of the cavity in the wall, measured along the optical axis, lies in the range $0.25 \leq l_{ib}/l_{ca} \leq 0.35$. Particularly if the cavity of the lamp vessel is in the shape of an ellipse provided with an infrared-reflecting and visible light-transmitting coating, and if a spiral-shaped linear incandescent body is arranged in the cavity, then said length ratio enables a very favorable reflection and transmission characteristic of the electric lamp to be obtained. The heat in the form of infrared light generated by the incandescent body is thus very effectively reflected back to the incandescent body, as a result of which the end portions become less hot, so that the pinch temperature of the electric lamp is lower.

The above-mentioned ratio of the length of the incandescent body to the length of the cavity in the wall, measured along the optical axis, can also be considered an invention in itself.

A particularly favorable embodiment of the electric lamp/reflector unit in accordance with the invention is characterized in that an internal current conductor which connects the electric light source with the metal foil is bent such that the electric light source is substantially situated on the optical axis. The better the electric light source is centered with respect to the spherical or elliptic shape of the cavity, the more effective the action of the infrared-reflecting coating and the higher the efficiency of the electric lamp is. In addition, the better the electric light source is centered with respect to the geometric center, which is preferably situated on the optical axis of the reflector body, the better the light distribution is as a result of the reflection from the concave reflecting surface of the reflector body.

The above-mentioned bending of the internal current conductor can also be considered an invention in itself.

In order to further reduce the temperature of the end portions, said end portions are sandblasted during the manufacture of the electric lamp. This has the advantage that the end portions are not covered with an infrared-reflecting coating, which leads to a reduction of the temperature of the end portions and hence of the pinch temperature. An additional advantage of sandblasting resides in that the surface of the end portions is roughened, so that a larger heat-radiating surface is obtained and hence overall internal light reflection in the end portions as a result of the coating is reduced.

In a preferred embodiment of the electric lamp/reflector unit in accordance with the invention, the metal foil and the first and the second current conductor are at least partly provided with a protective coating at the location of the connection point. This protective coating reduces the risk of corrosion of the metal foil and the current conductor at the location of the connection point. As a result of said corrosion protection, an acceptable service life of the electric lamp in the electric lamp/reflector unit is achieved while the risk of explosion of the lamp is negligible. Preferably, the protective coating contains chromium. It has been found that chromium can be effectively used as a protective coating on electric conductors of molybdenum and tungsten in quartz glass, and forms low-melting products with these materials.

A chromium protective layer having a layer thickness in the range from 0.5 to 2 μm is particularly favorable. The layer thickness of the coating is a parameter which, among other things, determines the degree of corrosion protection. If the layer thickness is below 0.5 μm, then the protective layer is too thin and the corrosion protection insufficient. At a layer thickness above 2 μm, too much material is used.

In a particularly favorable embodiment, the current conductor is led from the second end portion via an electroconductive connection along the reflecting surface to the neck-shaped portion of the reflector body. By arranging said connection at a short distance from the reflecting surface, instead of at a short distance from the electric light source, shadow formation, owing to this connection, by the reflecting surface is substantially reduced. An additional advantage resides in that such a position of the connection has a favorable effect on the heat balance of the electric lamp/reflector unit. Preferably, the connection is at least partly made from nickel. Nickel is a stable material having a good coefficient of heat conduction and it can also be used as a contact member of the electric lamp/reflector unit. A material which can be alternatively used for the manufacture of said connection is stainless steel.

These and other aspects of the invention will be apparent from and elucidated with reference to the embodiments described hereinafter.

BRIEF DESCRIPTION OF THE DRAWINGS

FIG. 2A is a cross-sectional view of the electric lamp in accordance with the invention.

The Figures are purely diagrammatic and not drawn to scale. Particularly for clarity some dimensions are exaggerated strongly. In the Figures, like reference numerals refer to like parts whenever possible.

DETAILED DESCRIPTION OF THE PREFERRED EMBODIMENTS

Figure 1A:
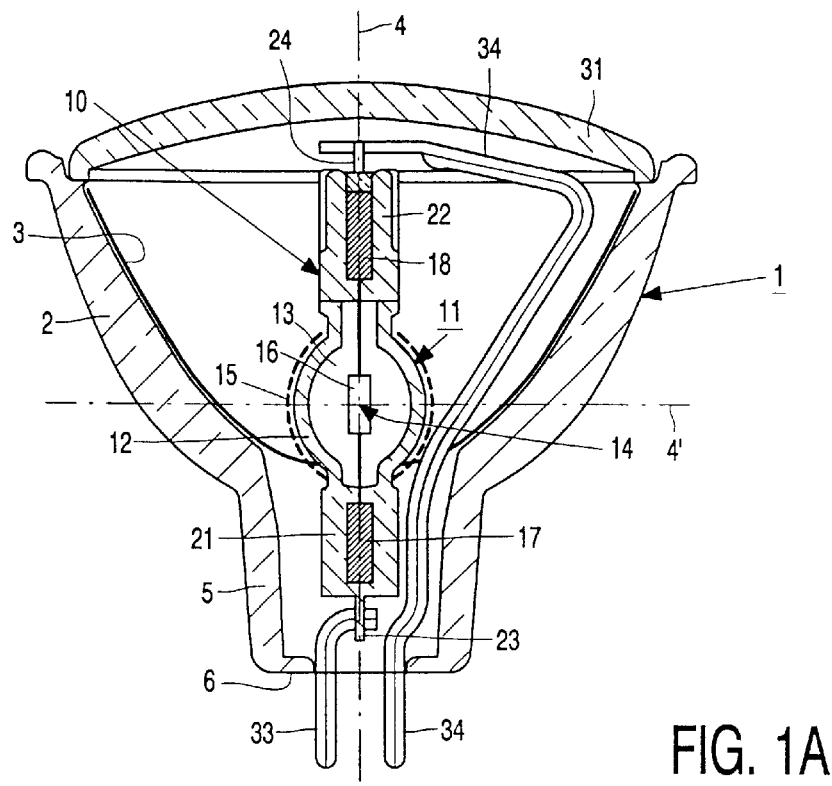
FIG. 1A is a cross-sectional view of an electric lamp/reflector unit in accordance with the invention.
Figure 1B:
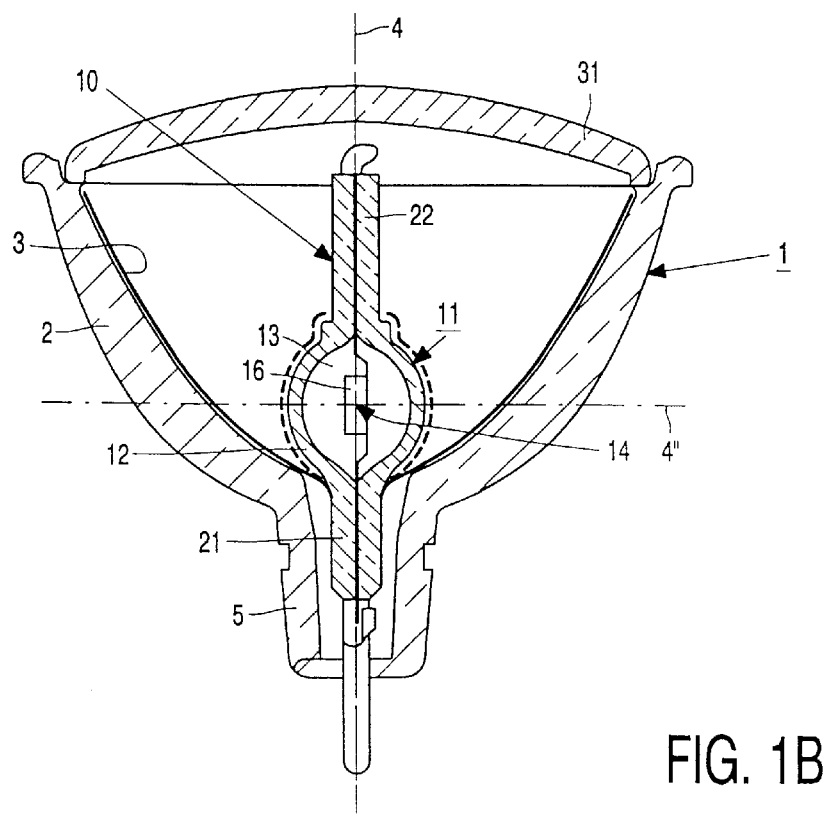
FIG. 1B shows the electric lamp/reflector unit of FIG. 1A, said unit being rotated about an optical axis through 90°.

FIG. 1A and 1B show an electric lamp/reflector unit in accordance with the invention in cross-section, the view of the unit shown in FIG. 1B being rotated about the optical axis 4 through 90° with respect to the unit shown in FIG. 1A. The electric lamp/reflector unit comprises a shaped reflector body 1 having a reflector portion 2 with a concave reflecting surface 3 and an optical axis 4. A hollow, neck-shaped portion 5 situated around the optical axis 4 is integral with the reflector portion 2. In the example shown in FIG. 1A and 1B, the emission window of the reflector body 1 is closed by means of a curved lens 31. In an alternative embodiment, said lens 31 is flat. The embodiment of the electric lamp/reflector unit shown in FIG. 1A and 1B is the reflector body 1 of the PAR 20, PAR 16 or MR 16 type.

The electric lamp/reflector unit further comprises an electric lamp 10 including a gastight light-transmitting lamp vessel 11 having a quartz glass wall 12 enclosing a cavity 13 of a predetermined, generally, spherical or elliptic shape with a geometric center 14. In the example shown in FIG. 1A and 1B, the shape of the cavity 13 is substantially elliptical. The cavity 13 of the lamp vessel 11 accommodates a substantially linear electric light source 16, for example an incandescent body in the form of a spirally wound tungsten wire. At the location where the wall 12 of the lamp vessel 11 is elliptical in shape, the wall 12 of the lamp vessel 11 is provided with an infrared-reflecting and visible light-transmitting coating 15. The infrared radiation generated by the incandescent body is reflected back to the incandescent body by this coating 15, causing the efficiency of the electric lamp 10 to be increased substantially. The visible light is passed by the coating 15.

Said infrared-reflecting and visible light-transmitting coatings 15 are known per se. Such coatings generally comprise a multilayer interference filter (>40 layers), the thicknesses of the individual optical layers being calculated by means of computer programs known to those skilled in the art. Such optical interference films are generally applied by means of coating techniques which are known per se, such as vapor deposition, dip coating, (reactive) sputtering and chemical vapor deposition.

The temperature of the end portions 21; 22 of the electric lamp 10 is reduced by sandblasting the end portions 21; 22 during the manufacture of the electric lamp 10. As a result, the coating is removed and a rough surface obtained which enhances heat emission.

In FIG. 1A and 1B, the geometric center 14 of the electric lamp/reflector unit is situated at the intersection of the optical axis 4 and a further axis 4'; 4" at right angles to the optical axis 4, in the center of the lamp vessel 11. In the wall 12 of the electric lamp 10, metal foils 17; 18 are embedded on both sides. These metal foils 17; 18 are connected to the electric light source 16. The electric lamp 10 further comprises a first end portion 21 and a second end portion 22 which are both provided with a seal. The second end portion 22 is arranged so as to be opposite to the first end portion 21. An electric lamp 10 comprising a combination of two end portions 21; 22 between which there is a cavity is commonly referred to as a double-ended electric lamp, in the example shown in FIG. 1A and 1B, a so-called double-ended halogen lamp. Through the end portions 21; 22, current conductors 23; 24 which are connected to the embedded metal foil 17; 18 issue from the lamp vessel 11 to the exterior.

The electric lamp 10 is arranged in the reflector body 1, the first end portion 21 being situated at least partly in the neck-shaped portion 5, the cavity 13 being situated within the reflecting portion 2, and the electric light source 16 being situated substantially on the optical axis 4.

FIG. 1A further shows that the current conductor 24 projects from the second end portion 22 and is guided via an electroconductive connection 34, along the reflecting surface 3, to the neck-shaped portion 5 of the reflector body 1. A particularly favorable connection 34 is made from nickel and has a diameter of at least substantially 1.5 mm. The current conductor 23 is correspondingly connected to an electroconductive connection 33.

Both connections 33; 34 issue from the reflector body 1 to the exterior via an end portion 6 and serve as contact members of the electric lamp/reflector unit.

Figure 2B:
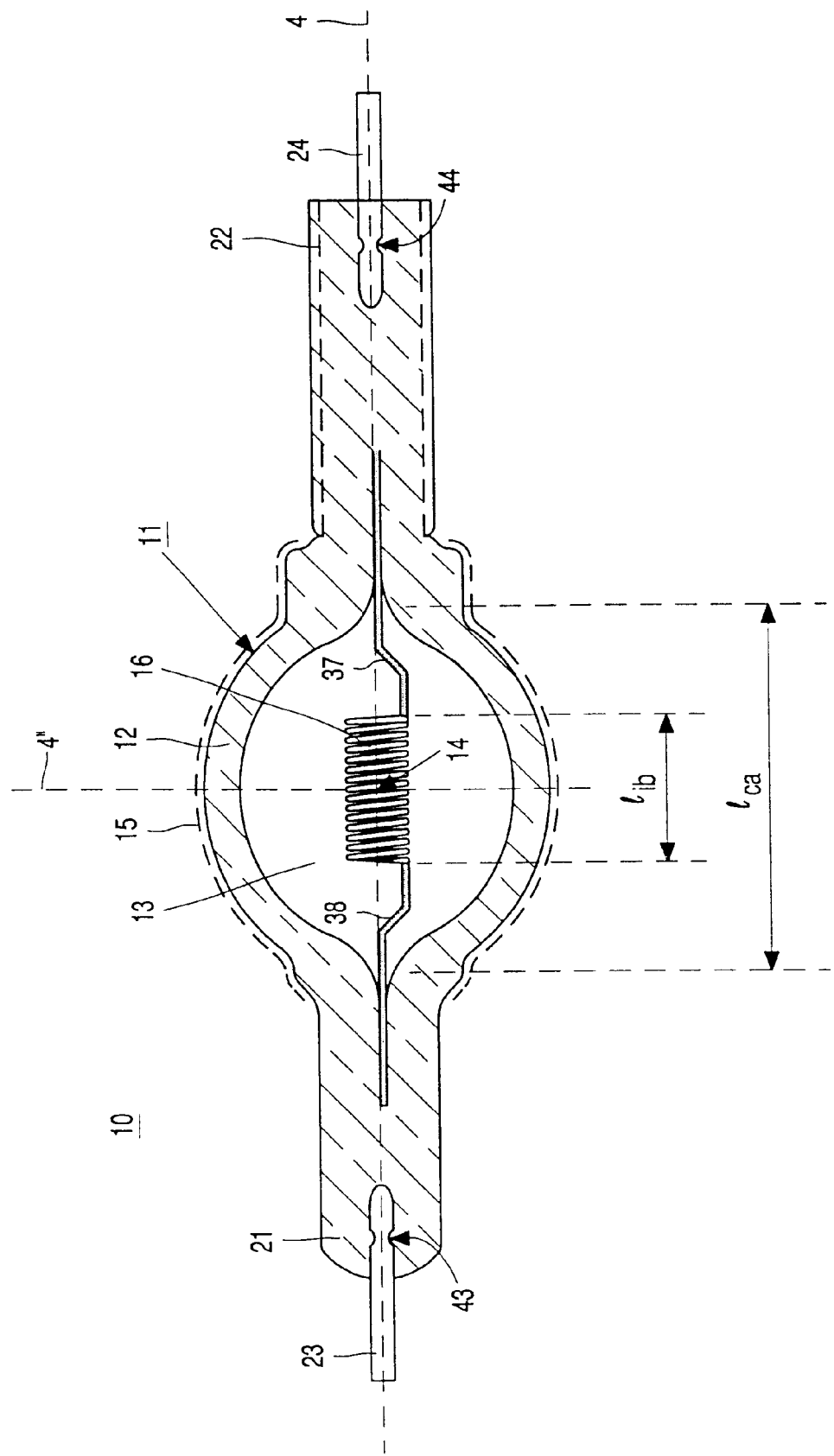
FIG. 2B shows the electric lamp of FIG. 2A, the lamp being rotated about the optical axis through 90°.

FIGS. 2A and 2B show the electric lamp 10 in accordance with the invention in cross-section, the view of the lamp in FIG. 2B being rotated about the optical axis 4 through 90° with respect to FIG. 2A. The linear electric light source 16 is situated in the geometric center 14 of the lamp vessel 11 of the electric lamp 10. The distance from said light source to the connection point 27; 28, where the current conductor 23; 24 is connected to the metal foil 17; 18, is indicated, in FIG. 2A, by $d_c^I; d_c^{II}$, which distance is measured with respect to the geometric center 14 at the intersection of the optical axis 4 and the further axis 4'; 4". In addition, in FIG. 2A, the length of the first and the second end portion 21; 22 is indicated by $l_{ep}^{I}; l_{ep}^{II}$, which distance is also measured with respect to the geometric center 14. In accordance with the invention, the ratio of the distance $d_c^{I}; d_c^{II}$ to the length $l_{ep}^{I}; l_{ep}^{II}$ complies with the relation $d_c^{I}/l_{ep}^{I} \geq 0.75$ and $d_c^{II}/l_{ep}^{II} \geq 0.75$.

Preferably, the ratio of the distance $d_c^{I}; d_c^{II}$ to the length $l_{ep}^{I}; l_{ep}^{II}$ lies in the range $0.8 \leq d_c^{I}/l_{ep}^{I} \leq 0.95$ and $0.8 \leq d_c^{II}/l_{ep}^{II} \leq 0.95$. Experiments have shown that a very suitable value of the ratio $d_c^{I}/l_{ep}^{I} = 0.86$ and $d_c^{II}/l_{ep}^{II} = 0.86$, at which values a service life of the electric lamp in the electric lamp/reflector unit is obtained which is at least 10% higher than the service life of the known electric lamp/reflector unit.

In a favorable embodiment of the electric lamp/reflector unit in accordance with the invention, the length $l_{ep}^{I}; l_{ep}^{II}$ of the first and the second end portion 21; 22 lies in the range $12 \leq l_{ep}^{I} \leq 22$ mm and $12 \leq l_{ep}^{II} \leq 22$ mm. Such a length of the end portions enables the electric lamp to be fitted in a so-called PAR 20 reflector body. If the length $l_{ep}^{I}; l_{ep}^{II}$ of the first and the second end portion 21; 22 is $l_{ep}^{I} \leq 18$ mm and $l_{ep}^{II} \leq 18$ mm, it is possible to fit the electric lamp in a so-called PAR 16 and in a so-called MR 16. Viewed along the optical axis 4, the neck-shaped portion 5 of a MR 16 reflector body is much shorter than that of a PAR reflector body having a corresponding diameter indication. A further saving of space is obtained by making the length $l_{ep}^{I}$ of the first end portion 21 in the neck-shaped portion 5 of the reflector body 1 substantially smaller than the length $l_{ep}^{II}$ of the second end portion 22. Preferably, the ratio of the length $l_{ep}^{I}$ of the first end portion 21 to the length $l_{ep}^{II}$ of the second end portion lies in the range $0.7 \leq l_{ep}^{I}/l_{ep}^{II} \leq 0.9$.

FIG. 2A and 2B show an electric light source 16 comprising a spirally wound incandescent body. In FIG. 2B, the length of the incandescent body is indicated by $l_{ib}$, which length is measured along the optical axis 4. The length of the cavity 13 in the wall 12, which is measured along the optical axis 4, is indicated by $l_{ca}$ in FIG. 2B. The efficiency of the electric lamp 10 provided with an infrared-reflecting and visible light-transmitting coating 15 is very favorably influenced if the ratio of the length $l_{ib}$ of the incandescent body to the length $l_{ca}$ of the cavity 13 lies in the range $0.25 \leq l_{ib}/l_{ca} \leq 0.35$.

Corrosion of the metal foil 17; 18 is effectively counteracted if the metal foil 17; 18 and the first and the second current conductor 23; 24 are at least partly provided with a protective layer (not shown in FIG. 2A and 2B) at the location of the connection point 27; 28. The protective layer is preferably made of chromium.

In the cavity 13 of the electric lamp 10, the electric light source 16 is connected to the metal foil 17; 18 by means of internal current conductors 38; 37, respectively. This internal current conductor 37; 38 is bent such that the electric light source 16 is predominantly situated on the optical axis 4. In the manufacture of the electric lamp 10, the internal current conductors 37; 38 are provided twice with a bend (the result of bending is shown in FIG. 2B). By virtue of these bends, it is achieved that the predominantly linear electric light source 16, which is an incandescent body wound in the form of a spiral in the example shown in FIGS. 2A and 2B, is centered around the optical axis 4, with the center of the electric light source 16 being situated in the geometric center 14 of the electric lamp/reflector unit after the electric lamp 10 has been provided in the reflector body 1.

FIG. 2B also shows that the current conductor 23; 24 is provided with a plastically deformed portion 43; 44 near the end of the end portion 21; 22, which plastically deformed portion serves to improve the anchorage of the current conductor 23; 24 in the end portion 21; 22. Anchorage of the current conductor 23; 24 takes place in cooperation with the enclosing wall 12 of the end portion 21; 22. Since the connection points 27; 28 (see FIG. 2A) are situated near the end of the first and the second end portion, such anchorage has a positive effect on the service life of the electric lamp 10. In the example shown in FIG. 2B, the deformed portion 43; 44 has at least two different diameters. In an alternative embodiment, the anchor comprises a flattened portion, a bent portion or a partly ground away portion of the current conductor 23; 24.

Fifty 12 V double-ended halogen lamps having an overall length of $l_{ep}^{I} + l_{ep}^{II} = 14 + 17 = 31$ mm are arranged in a MR 16 reflector body 1. The length of the embedded metal foil 17; 18, which is measured along the optical axis 4, is 5.5 mm for the first end portion 21 and 7 mm for the second end portion 22. The width of the embedded metal foil 17; 18, which is measured along the further axis 4', is 2 mm. The distance between connection points 27 and 28, where the current conductor 23; 24 is connected to the metal foil 17; 18 is $d_c^{I} = 12$ mm in the first end portion 21 and $d_c^{II} = 14.7$ mm in the second end portion 22. Consequently, the ratio of the distance $d_c^{I}; d_c^{II}$ to the length $l_{ep}^{I}; l_{ep}^{II}$ is $d_c^{I}/l_{ep}^{I} \approx 0.86$ and $d_c^{II}/l_{ep}^{II} \approx 0.86$. The ratio of the length $l_{ep}^{II}$ of the first end portion (21) to the length $l_{ep}^{II}$ of the second end portion (22) is $l_{ep}^{I}/l_{ep}^{II} \approx 0.82$.

The lamp vessel 11 of the double-ended halogen lamps in accordance with the invention has an elliptical cavity 13 with a so-called long axis of approximately 11 mm and a so-called short axis of approximately 10 mm. The outer surface of the cavity 13 is provided with an infrared-reflecting and visible light-transmitting coating 14. The coating 14 comprises a 47-layer $Nb_2O_5/SiO_2$ infrared-reflecting interference filter (effective reflection in the wavelength range $760 \leq \lambda \leq 2000$ nm) which is provided by means of reactive sputtering.

The electric light source 16 in the lamp vessel 11 of the halogen lamps comprises a spirally wound incandescent body having a length $l_{ib} = 3.2$ mm, and the length of the cavity 13 in the wall 12, measured along the optical axis 4, is $l_{ca} = 12.5$ mm (see FIG. 2B). Thus, the ratio of the length of the incandescent body $l_{ib}$ to the length $l_{ca}$ of the cavity 13 is $l_{ib}/l_{ca} \approx 0.26$.

The above-mentioned fifty 12 V electric lamp/reflector units have been subjected to a life test. At a constant energy consumption, the light output was 20% higher than the light output of corresponding 12 V electric lamp/reflector units. As a result of the measures in accordance with the invention, the service life of the halogen lamps in the electric lamp/reflector units was 25% longer than that of the corresponding 12 V electric lamp/reflector units, namely $\geq 5,000$ hours.

It will be obvious that, within the scope of the invention, many variations are possible to those skilled in the art. For example, the invention is not limited to an electric lamp/reflector unit comprising an electric lamp including an incandescent body; the electric lamp may alternatively comprise an electrode pair in an ionisable gas. In addition, the infrared-reflecting and visible light-transmitting coating provided on the electric lamp may be omitted.

The scope of protection of the invention is not limited to the above-described examples. The invention is embodied in each novel characteristic and each combination of characteristics. Reference numerals in the claims do not limit the scope of protection thereof. The use of the term "comprising" does not exclude the presence of elements other than those mentioned in the claims. The use of the word "a" or "an" in front of an element does not exclude the presence of a plurality of such elements.

What is claimed is:

1. An electric lamp/reflector unit comprising:

a reflector body (1) including a reflector portion (2) having a concave reflecting surface (3) with an optical axis (4) and, integral therewith, a hollow neck-shaped portion (5) about the optical axis (4), and an electric lamp (10) provided with a gastight light-transmitting lamp vessel (11), and comprising a quartz-glass wall (12) which encloses a cavity (13) of a predetermined, in general, spherical or elliptic shape with a geometric center (14), said wall (12) being at least partly provided with an infrared-reflecting and visible light-transmitting coating (15), and said cavity (13) accommodating a, substantially, linear electric light source (16), and said lamp also comprising a metal foil (17; 18) which is entirely embedded in the wall (12) and connected to the electric light source (16), and comprising a first end portion (21) and a second end portion (22) which are arranged so as to be opposite to each other and which both comprise a seal, through which seals a respective current conductor (23; 24) which is connected to the embedded metal foil (17; 18), issues from the lamp vessel (11) to the exterior, wherein, the electric lamp (10) is arranged in the reflector body (1) in such a manner that the first end portion (21) is at least partly situated in the neck-shaped portion (5), the cavity (13) is situated within the reflecting portion (2) and the electric light source (16) is predominantly situated on the optical axis (4), the connection point (28) where the first end portion current conductor (23) is connected to the metal foil (17) of the first end portion (21) being a distance $d_c^I$ from the geometric center (14), the first end portion (21) having a length $l_{ep}^I$ measured from the geometric center (14), the connection point (27) where the second end portion current conductor (24) is connected to the metal foil (18) of the second end portion (22) being a distance $d_c^{II}$ from the geometric center (14), the second end portion (22) having a length $l_{ep}^{II}$ measured from the geometric center (14), and wherein the ratios of the distances $d_c^I;d_c^{II}$ to the respective lengths $l_{ep}^I;l_{ep}^{II}$ is $d_c^I/l_{ep}^I>0.75$ and $d_c^{II}/l_{ep}^{II}>0.75$.

2. An electric lamp/reflector unit as claimed in claim 1, wherein the ratio of the distance $d_c^I;d_c^{II}$ to the length $l_{ep}^I;l_{ep}^{II}$ lies in the range $0.8 \leq d_c^I/l_{ep}^I \leq 0.95$ and $0.8 \leq d_c^{II}/l_{ep}^{II} \leq 0.95$.

3. An electric lamp/reflector unit as claimed in claim 1 or 2, wherein the length $l_{ep}^I;l_{ep}^{II}$ of the first and the second end portion (21; 22) lies in the range $12 \leq l_{ep}^I \leq 22$ mm and $12 \leq l_{ep}^{II} \leq 22$ mm.

4. An electric lamp/reflector unit as claimed in claim 3, wherein the length $l_{ep}^I;l_{ep}^{II}$ of the first and the second end portion (21; 22) is $l_{ep}^I \leq 18$ mm and $l_{ep}^{II} \leq 18$ mm.

5. An electric lamp/reflector unit as claimed in claim 1 wherein the length $l_{ep}^I$ of the first end portion (21) in the neck-shaped portion (5) of the reflector body (1) is substantially smaller than the length $l_{ep}^{II}$ of the second end portion (22).

6. An electric lamp/reflector unit as claimed in claim 5, wherein the ratio of the length $l_{ep}^I$ of the first end portion (21) to the length $l_{ep}^{II}$ of the second end portion (22) lies in the range $0.7 \leq l_{ep}^I/l_{ep}^{II} \leq 0.9$.

7. An electric lamp/reflector unit as claimed in claim 1 or 2, wherein the electric light source (16) comprises an incandescent body having a length $l_{ib}$, and the ratio of the length of the incandescent body $l_{ib}$ to the length $l_{ca}$ of the cavity (13) in the wall (12), measured along the optical axis (4), lies in the range $0.25 \leq l_{ib}/l_{ca} \leq 0.35$.

8. An electric lamp/reflector unit as claimed in claim 1 wherein the end portions (21; 22) are sandblasted during the manufacture of the electric lamp (10).

9. An electric lamp/reflector unit as claimed in claim 1 wherein the metal foil (17; 18) and the first and the second current conductor (23; 24) are at least partly provided with a protective coating at the location of the connection point (27; 28).

10. An electric lamp/reflector unit as claimed in claim 9, wherein the protective layer comprises chromium.

11. An electric lamp/reflector unit as claimed in claim 1 wherein an internal current conductor (37; 38) which connects the electric light source (16) with the metal foil (17; 18) is bent such that the electric light source (16) is substantially situated on the optical axis (4).

12. An electric lamp/reflector unit as claimed in claim 1 wherein the current conductor (24) is led from the second end portion (22) via an electroconductive connection (34) along the reflecting surface (3) to the neck-shaped portion (5) of the reflector body (1).

13. An electric lamp/reflector unit as claimed in claim 1 wherein the electroconductive connection (34) is at least partly made of nickel.

14. An electric lamp/reflector unit as claimed in claim 1 wherein the current conductor (23; 24) is provided, near the end of the end portion (21; 22), with a plastically deformed portion (43; 44) which serves to improve the anchorage of the current conductor (23; 24) in the end portion (21; 22).

15. An electric lamp (10) for use in an electric lamp/reflector unit as claimed in claim 1.

* * * * *